US012732018B2

(12) United States Patent
Conca et al.

(10) Patent No.: US 12,732,018 B2
(45) Date of Patent: Sep. 8, 2026

(54) SIGNALING SOLUTIONS FOR ELECTRICAL INSTALLATIONS

(71) Applicant: ABB S.p.A., Milan (IT)

(72) Inventors: Roberto Conca, Dalmine (IT); Crescenzo Dassi, Bergamo (IT)

(73) Assignee: ABB S.p.A., Milan (IT)

( * ) Notice: Subject to any disclaimer, the term of this patent is extended or adjusted under 35 U.S.C. 154(b) by 369 days.

(21) Appl. No.: 18/495,118

(22) Filed: Oct. 26, 2023

(65) Prior Publication Data

US 2024/0162745 A1 May 16, 2024

(51) Int. Cl.

*H02J 13/12* (2026.01)
*G01S 1/04* (2006.01)
*H02J 13/13* (2026.01)
*H02J 13/36* (2026.01)
*H04L 1/1607* (2023.01)

(52) U.S. Cl.

CPC ............ *H02J 13/12* (2026.01); *G01S 1/0428* (2019.08); *G01S 1/047* (2013.01); *H02J 13/1335* (2026.01); *H02J 13/36* (2026.01); *H04L 1/1635* (2013.01)

(58) Field of Classification Search

CPC ........................................................ G01S 1/047
USPC ........................................................ 700/286
See application file for complete search history.

(56) References Cited

U.S. PATENT DOCUMENTS 10,630,069 B2 * 4/2020 Kennedy ................ H02H 3/445
2006/0154642 A1 * 7/2006 Scannell, Jr. ........... F21S 6/002 455/404.1
2015/0270083 A1 9/2015 Masseboeuf et al.
2018/0332038 A1 * 11/2018 Kagan ..................... G06F 21/35
2022/0200333 A1 6/2022 Maret et al.
2022/0328273 A1 * 10/2022 Vaghasiya ......... H02J 13/00004

FOREIGN PATENT DOCUMENTS

CN 102984780 A 3/2013
CN 107104511 A 8/2017

OTHER PUBLICATIONS

European Extended Search Report, Application No. 22207536.8, dated May 4, 2023, 7 pps.
Indian Office Action for Application No. 202344070226, dated May 31, 2024, 6 pages.

* cited by examiner

*Primary Examiner* — Mohammad Ali
*Assistant Examiner* — Joshua T Sanders
(74) *Attorney, Agent, or Firm* — McCarter & English, LLP

(57) ABSTRACT

The present disclosure relates to a control device for electrical installations, which has improved signaling capabilities in alert conditions, particularly when said control device is no more fed by a power supply and it cannot carry out its control and monitoring functionalities. In a further aspect, the present disclosure relates to a computerized signaling system for an electrical installation, characterized in that it comprises one or more control devices having the above-mentioned improved signaling capabilities and a software application stored in one or more mobile computerized devices. Said software application is configured to make each mobile computerized mobile detect the beacon data packets broadcasted by said control devices in alert conditions.

20 Claims, 2 Drawing Sheets

SIGNALING SOLUTIONS FOR ELECTRICAL INSTALLATIONS

CROSS REFERENCE TO RELATED APPLICATIONS

This patent application claims the benefit and priority of European Patent Application No. 22207536.8 filed on Nov. 15, 2022, the disclosure of which is incorporated by reference herein in its entirety as part of the present application.

BACKGROUND

The present disclosure relates to the field of electrical installations, may be operating at low-voltage levels. More particularly, the present disclosure relates to improved signaling solutions for signaling the presence of possible fault or malfunction conditions in an electrical installation.

As is known, an electrical installation (e.g., an electric grid, an electric switchgear system, an electric switchboard, and the like) normally includes a number of switching devices (e.g., circuit breakers, disconnectors, contactors, and the like) designed to allow or prevent the flow of electric currents along corresponding electric lines.

Typically, each switching device includes or is operatively associated to a control device (e.g., a so-called "protection relay") designed to carry out control functionalities of the operation of said switching device (e.g., commanding the intervention of the switching device in the event of faults or overloads) and, possibly, monitoring functionalities (e.g., providing data sets related to the operating status of the associated switching device or electric line).

As is known, these control devices are normally fed by suitable power supply units capable of harvesting electric power from an electric line of the electrical installation.

Consequently, such control devices are no more fed and they cannot carry out the above-mentioned control and monitoring functionalities, when the associated switching devices or other switching devices of the same electrical installation intervene, for any reason, to cause the interruption of the feeding electric line.

In this situation, since the corresponding control devices are switched off, the actual operating status of the installed switching devices must necessarily be ascertained directly on the field by an operator.

As it is easy to guess, this activity may be laborious, time-consuming and even risky when an electrical installation includes a large number of switching devices, possibly difficult to access physically by an operator.

In the market, it is quite felt the need for innovative solutions able to overcome or mitigating the above-mentioned technical issues.

BRIEF DESCRIPTION

Embodiments of the present disclosure provide a control device for electrical installations, according to the following claim 1 and the related dependent claims.

The control device, according to the disclosure, is operatively couplable to or included in a switching device and it includes or is electrically connectable to a first power supply unit to be fed by this latter. In order to feed said control device, said first power supply unit is configured to harvest electric power from an electric line controlled by said switching device or by a further switching device.

The control device, according to the disclosure, includes a control unit and a wireless transceiver unit operatively coupled to said control unit. Said wireless transceiver unit is configured to communicate to other electronic devices using a short-range communication protocol; a second power supply unit operatively coupled to said wireless transceiver. Said second power supply unit is configured to feed said wireless transceiver, when said first power supply unit cannot feed said control device.

Said wireless transceiver unit is configured to broadcast beacon data packets cyclically and for a predetermined time interval, if said first power supply unit cannot feed said control device anymore.

These beacon data packets include information signaling an alert condition for the control device and they are detectable by at least a mobile computerized device, in which a software application configured to detect and process said beacon data packets is stored and executed.

Said wireless transceiver unit may be configured to communicate using a short-range communication protocol different from communication protocols using OFDM or QAM techniques.

Said wireless transceiver unit may be configured to communicate using a Bluetooth or Zigbee communication protocol.

Said wireless transceiver unit may be configured to interrupt the transmission of said beacon data packets, if said wireless transceiver unit receives an acknowledgment message from a mobile computerized device detecting said beacon data packets.

Said second power supply unit may include a battery or a storage capacitor.

The control device, according to the disclosure, may include a first HMI unit operatively coupled to said control unit. The first HMI unit is configured in such a way that a user can set one or more transmission parameters of said beacon data packets by said wireless transceiver unit through said first HMI unit.

The control device, according to the disclosure, may include a second HMI unit operatively coupled to said wireless transceiver unit. The second HMI unit is configured in such a way that a user can command said wireless transceiver unit to broadcast said beacon data packets through said second HMI unit. Said wireless transceiver unit is configured to broadcast said beacon data packets in response to a command received from said second HMI unit, only if said first power supply unit cannot feed said control device.

In a further aspect, the present disclosure relates to a computerized signaling system for electrical installations, according to claim 8 and the related dependent claims.

The computerized signaling system, according to the disclosure, includes one or more control devices, according to the disclosure, configured as described above; a software application stored in and executed by at least a mobile computerized device. Said software application is configured to detect the beacon data packets broadcasted by at least one of said control devices.

Said software application may be configured to generate and display a notification, if said beacon data packets are detected by said mobile computerized device.

Said software application may be configured to send an alert message to one or more remote computerized devices or platforms, if said beacon data packets are detected.

Said software application may be configured to transmit an acknowledgement message to the control device transmitting said beacon data packets, if said beacon data packets are detected.

In yet another further aspect, the present disclosure relates to a switching device, according to claim 12.

BRIEF DESCRIPTION OF THE DRAWINGS

Further characteristics and advantages of the present disclosure will emerge more clearly from the description of example, but not exclusive embodiments of the computerized system, according to the disclosure, of which non-limiting examples are shown in the attached drawings, wherein.

DETAILED DESCRIPTION

With reference to the above-mentioned figures, the present disclosure concerns improved signaling solutions in electrical installations (e.g., electric grids, electric switchgear systems, electric switchboards, and the like), which may operate at low-voltage levels, i.e., at voltage levels lower than 1.5 kV AC and 2.0 kV DC.

In a first aspect, the present disclosure refers to a control device 1 for controlling the operation of a switching device 100 in an electrical installation.

The switching device 100 may be a circuit breaker, disconnector, contactor, or the like.

In principle, the control device 1 may be any intelligent electronic device (IED) operatively associated to the switching device 100 to control the operation of this latter and, possibly, provide monitoring functionalities of specific parts of the electrical installation.

In order to carry out the above-mentioned functionalities, the control device 1 may communicate in a wired or wireless manner with suitable sensors (not shown) or other electronic devices or accessories (not shown).

The control device 1 may be a protection and control relay or a controller.

The control device 1 is operatively coupled to or included in the switching device 100.

Figure 1:
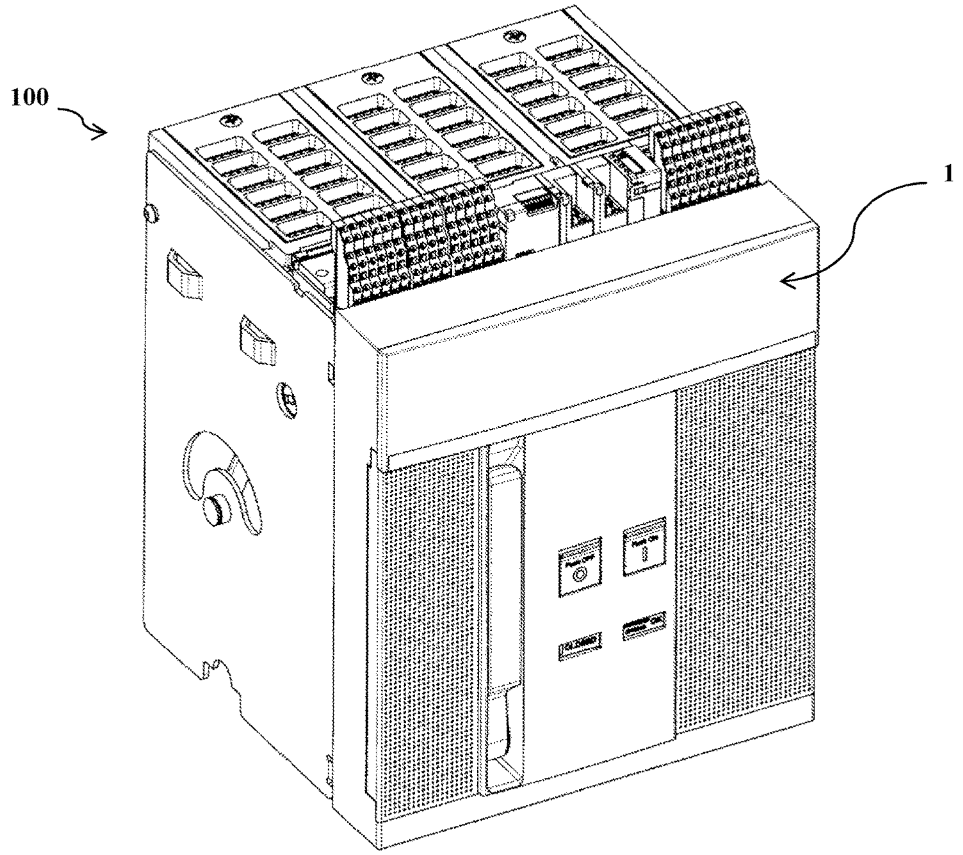
FIG. 1 is a schematic view showing a switching device including a control device, according to the disclosure.

FIG. 1 shows an example of switching device 100 incorporating the control device 1. In this case, the switching device 100 is a circuit breaker and the control device 1 is a protection and control relay integrated in the overall structure of the circuit breaker.

According to other solutions, however, the control device 1 may be a self-standing device distinct the switching device associated thereto but operatively coupled to this latter.

In normal operating conditions (i.e., in absence of faults or malfunctions), the control device 1 is fed by a first power supply unit 9.

The first power supply unit 9 may be included in the switching device 100 and is electrically connected to the control device 1.

According to other solutions, however, the first power supply unit 9 may be at least partially included in the control device 1 or be a self-standing device operatively coupled to this latter. In order to feed the control device 1, the first power supply unit 9 advantageously harvests electric power from a feeding electric line of the electrical installation, more from a feeding electric line controlled by the switching device 100 or by a further switching device of the electrical installation.

The first power supply unit 9 may include a current transformer stage coupled to the feeding electric line and suitable electronic circuits to exploit a feeding current provided by the current transformer stage in such a way to provide suitable feeding voltages to feed the internal components of the control device 1.

In general, the first power supply unit 9 may be realized according to solutions of known type and, hereinafter, it will not be described in more details for the sake of clarity.

According to the disclosure, the control device 1 includes a control unit 4.

In operation, the control unit 4 may carry out internal and external diagnostic activities and provides suitable commands to prompt the intervention of the associated switching device 100 in the event of anomalous conditions in the electrical installation, e.g., in case of fault or overload conditions.

The control unit 4 may include one or more main digital processing devices (e.g., one or more microprocessors) and other suitable signal processing circuits.

In general, the control unit 4 may be realized according to solutions of known type and, hereinafter, it will not be described in more details for the sake of clarity.

According to the disclosure, the control device 1 includes a wireless transceiver unit 2 operatively coupled to the control unit 4.

The wireless transceiver unit 2 is configured to communicate with other electronic devices at local level, i.e., within a range of few meters (e.g., 10 m) at most.

To this aim, the wireless transceiver unit 2 is configured to employ a short-range communication protocol.

Such a short-range communication protocol may be different from a Wi-Fi communication protocol or other communication protocols using OFDM (Orthogonal Frequency-Division Multiplexing) or QAM (Quadrature Amplitude Modulation) techniques.

The wireless transceiver unit 2 may be configured to communicate using a Bluetooth communication protocol, more particularly a BLE (Bluetooth Low Energy) communication protocol.

According to alternative solutions, however, the wireless transceiver unit 2 may be configured to communicate using short-range communication protocols of different type, for example a Zigbee communication protocol.

According to the disclosure, the control device 1 includes a second power supply unit 3 operatively coupled to the wireless transceiver unit 2.

The second power supply unit 3 is configured to feed the wireless transceiver unit 2 in alert conditions, namely when the first power supply unit 9 cannot feed the control device 1 for any reason.

The above-mentioned alert conditions may include, for example, the following operating conditions:

- an internal fault of the first power supply unit 9;
- an internal fault of the control unit 4; and
- any operating condition of the electrical installation, in which the switching device 100 or another switching device has carried out an opening maneuver and caused the interruption of the feeding electric line, from which the power supply unit 9 harvests electric power.

The second power supply unit 3 may include a battery or a storage capacitor and suitable power supply circuits to feed the wireless transceiver unit 2.

Since it has necessarily a limited energy storage capacity, the second power supply unit 3 allows the transceiver unit 2 to operate temporarily (i.e., for a relatively short time interval) when the remaining components of the control device 1 are turned off or disabled (as they are not fed anymore by the first power supply unit 9).

In general, the second power supply unit 3 may be realized according to solutions of known type and, hereinafter, it will not be described in more details for the sake of clarity.

As mentioned above, in general, the control device 1 normally carries out control functionalities related to the operation of said switching device and, possibly, monitoring functionalities of the operation of specific parts of the electrical installation.

According to the disclosure, however, the control device 1 has improved signaling capabilities in alert conditions, namely when it is no more fed by the first power supply 9 and it cannot carry out its typical control and monitoring functionalities.

According to the disclosure, in fact, the wireless transceiver unit 2 is configured to broadcast cyclically beacon data packets B for a predetermined time interval, when the first power supply unit 9 cannot feed the control device 1 and the wireless transceiver unit 2 is fed by the second power supply unit 3.

The beacon data packets B are short messages including information signaling an alert condition of the control device.

As an example, each beacon data packet B may include a data field including an alert timestamp, a data field including information about the kind of signaled alert condition and, possibly, one or more data fields including measured values of physical quantities detected when the signaled alert condition occurred.

As mentioned above, the wireless transceiver unit 2 is configured to broadcast the beacon data packets B cyclically (for example with a transmission period of 0.5 s) and for a predetermined time interval only (for example 10 min).

The control device 1 may include a first HMI unit 5 operatively coupled to the control unit 4.

The first HMI unit 5 is configured to allow a user to interact (i.e., checking output data, sending commands or input data) with the control unit 4 and it may include, for example, a touch display, a keyboard/display system, or another equivalent interface of known type.

The first HMI unit 5 may be used to set one or more transmission parameters of the beacon data packets B, for example the above-mentioned transmission period and transmission interval, according to which the wireless transceiver unit 2 transmits the beacon data packets B.

This allows a user to tune the workload of the wireless transceiver unit 2 when alert conditions are present. In this way, it is possible to prevent an excessive discharge of the second power supply unit 3.

The control device 1 may include a second HMI unit 6 operatively coupled to the wireless transceiver unit 2.

The second HMI unit 6 is configured to allow a user to send commands directly to the wireless transceiver unit 2 and it may include, for example, a button or another equivalent interface of known type.

A user may use the second HMI unit 6 to command the wireless transceiver unit 2 to broadcast the beacon data packets B. On the other hand, the wireless transceiver unit 2 is configured to transmit the beacon data packets B in response to a command received through the second HMI unit 6, may be only if alert conditions are present, i.e., the control device 1 cannot be fed by the first power supply unit 9.

By virtue of the above-described solution, a user can check the operating conditions of the switching device 100 associated to the control device 1, even if the transmission of the above-mentioned beacon data packets B is not in progress (e.g., since the transmission interval of the beacon data packets B has lapsed).

According to the disclosure, the beacon data packets B are detectable by at least a mobile computerized device 50, in which a software application 50A is stored and conveniently executed. In this way, a user can learn that alert conditions are present in the electrical installation by simply using the mobile computerized device 50.

In general, the mobile computerized device 50 (which, in itself, may not form a part of the present disclosure) may be of any type, for example a smartphone, a tablet, a portable computer, and the like.

The mobile computerized device 50 advantageously includes a number of wireless communication modules, in particular at least a communication port for short-range wireless communications, for example a Bluetooth or Zigbee communication module.

According to the disclosure, the software application 50, when executed by the mobile computerized device 50, detects and processes the beacon data packets B transmitted by the wireless transceiver unit 2 in alert conditions.

The software application 50A may generate and display a notification N, when the beacon data packets B, transmitted by the wireless transceiver unit 2, are detected. In this way, the user of the mobile computerized device 50 can immediately learn that alert conditions are present in the electrical installation and, possibly, take the most appropriate actions.

The software application 50A may send an alert message AL to one or more remote computerized devices or platforms 500, when the beacon data packets B, transmitted by the wireless transceiver unit 2, are detected.

As an example, the software application 50A may send an alert message AL to a computerized platform configured to transmit said alert message to other computerized device enabled to access the transmitted data.

The mobile computerized device 50 can transmit the alert message AL in a known manner, for example through the Internet or through a suitable WAN (Wireless Area Network).

This solution is apparently directed to favor a remote monitoring of the operating conditions of the electrical installation as well as the planning of maintenance interventions.

The software application 50A may send an acknowledgement message ACK to the wireless transceiver unit 2, when the beacon data packets B are detected. Conveniently, the wireless transceiver unit 2 stops transmitting the beacon data packets B in response to receiving the acknowledgement message ACK.

This solution is also directed to reduce the overall workload of the wireless transceiver unit 2 in alert conditions, thereby preventing a useless discharge of the second power supply unit 3.

Figure 2:
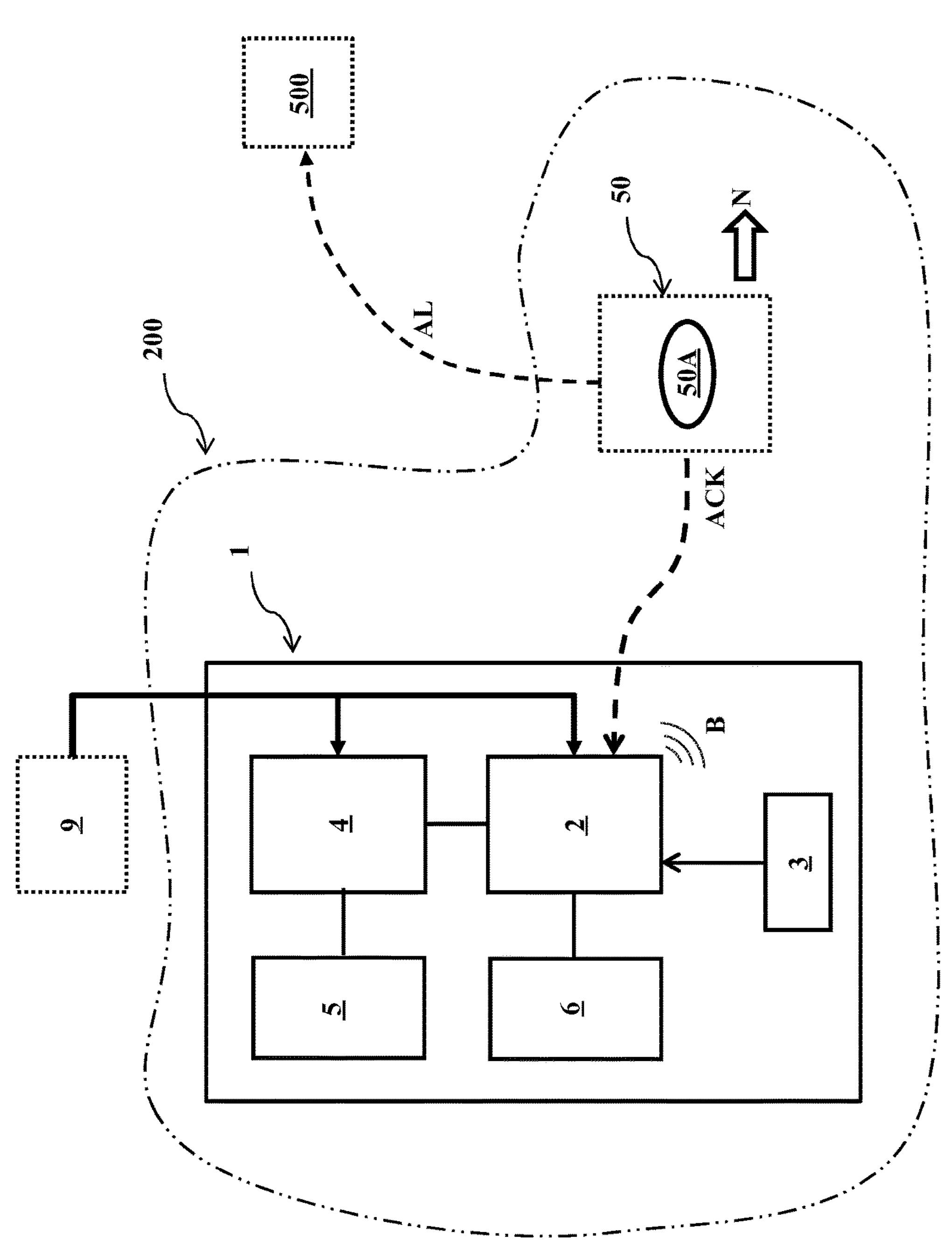
FIG. 2 is a schematic view showing a computerized signaling system, according to the disclosure.

From the above, it is apparent how, in a further aspect, the present disclosure relates to a computerized signaling system 200 for an electrical installation (FIG. 2).

According to the disclosure, the computerized signaling system 200 includes one or more control devices 1 arranged as described above and a software application 50A stored in one or more mobile computerized devices 50 as described above. The software application 50A, when executed by a respective mobile computerized device 50, makes the mobile computerized device detect the beacon data packets B broadcasted by the wireless transceiver unit 2 of at least one of the control devices 1 in alert conditions, i.e., when said control device cannot be fed by a corresponding first power supply unit 9 and it is fed by the corresponding second power supply unit 3.

When executed by a respective mobile computerized device 50, the software application 50A may make the mobile computerized device generate and display a notification N, if the beacon data packets B are detected by said mobile computerized device.

When executed by a respective mobile computerized device 50, the software application 50A may make the mobile computerized device send an alert message AL to one or more remote computerized devices or platforms 500, if the beacon data packets B are detected.

When executed by a respective mobile computerized device 50, the software application 50A may make the mobile computerized device transmit an acknowledgement message ACK to the control device 1, which transmits the beacon data packets B, if said beacon data packets are detected.

It has been seen in practice how the signaling solutions provided by the present disclosure provides relevant technical advantages over the state of the art.

The control device and computerized signaling system, according to the disclosure, allows a user to acquire information about the presence of alert conditions in an electrical installation without the need of directly accessing to each switching device.

The solution proposed by the claimed disclosure therefore allows a more efficient and safer identification of faults in the electrical installation, thereby reducing the risk that faults or malfunctions of the electrical installation remain unattended for some reasons and reducing the risks for the surveillance personnel.

The solution proposed by the claimed disclosure additionally favors the execution of urgent interventions in the electrical installation and the planning of targeted maintenance interventions. This allows reducing the duration and costs of possible shutdowns in the electrical installation.

The control device and computerized signaling system, according to the disclosure, require relatively small computational resources and relatively easy and cheap to implement at industrial level.

What is claimed is:

1. A control device for electrical installations, wherein the control device is operatively couplable to or included in a switching device and includes or is electrically connectable to a first power supply unit, wherein the first power supply unit is configured to harvest electric power from a feeding electric line to feed the control device, and wherein the control device comprises:

a control unit;

a wireless transceiver unit operatively coupled to the control unit, wherein the wireless transceiver unit is configured to communicate with other electronic devices using a short-range communication protocol; and a second power supply unit operatively coupled to the wireless transceiver unit, wherein the second power supply unit is configured to feed the wireless transceiver unit when the first power supply unit cannot feed the control device, wherein the wireless transceiver unit is configured to broadcast beacon data packets cyclically and for a predetermined time interval if the first power supply unit cannot feed the control device due to an interruption of the electric feeding line from which the first power supply unit harvests the electric power, wherein the beacon data packets include information signaling an alert condition, and wherein the beacon data packets are detectable by at least a mobile computerized device, in which a software application configured to detect and process the beacon data packets is stored and executed.

2. The control device according to claim 1, wherein the wireless transceiver unit is configured to communicate using a short-range communication protocol different from communication protocols using orthogonal frequency-division multiplexing (OFDM) or quadrature amplitude (QAM) techniques.

3. The control device according to claim 1, wherein the wireless transceiver unit is configured to communicate using a Bluetooth or Zigbee communication protocol.

4. The control device according to claim 1, wherein the wireless transceiver unit is configured to interrupt a transmission of the beacon data packets if the wireless transceiver unit receives an acknowledgment message from the mobile computerized device detecting the beacon data packets.

5. The control device according to claim 1, wherein the second power supply unit includes a battery or a storage capacitor.

6. The control device according to claim 1, wherein;

the control device comprises a first HMI unit operatively coupled to the control unit, and a user can set one or more transmission parameters of the beacon data packets by the wireless transceiver unit through the first HMI unit.

7. The control device according to claim 6, wherein:

the control device comprises a second HMI unit operatively coupled to the wireless transceiver unit, a user can command the wireless transceiver unit to broadcast the beacon data packets through the second HMI unit, and the wireless transceiver unit is configured to broadcast the beacon data packets in response to a command received from the second HMI unit if the first power supply unit cannot feed the control device.

8. A computerized signaling system for electrical installations, wherein the computerized signaling system comprises:

one or more control devices, wherein each of the one or more control devices are operatively couplable to or included in a switching device and includes or is electrically connectable to a first power supply unit, and wherein the first power supply unit is configured to harvest electric power from a feeding electric line to feed each of the one or more control devices, each of the one or more control devices comprising:

a control unit:

a wireless transceiver unit operatively coupled to the control unit, wherein the wireless transceiver unit is configured to communicate with other electronic devices using a short-range communication protocol; and a second power supply unit operatively coupled to the wireless transceiver unit, wherein the second power supply unit is configured to feed the wireless transceiver unit when the first power supply unit cannot feed each of the one or more control devices, wherein the wireless transceiver unit is configured to broadcast beacon data packets cyclically and for a predetermined time interval if the first power supply unit cannot feed each of the one or more control devices due to an interruption of the electric feeding line from which the first power supply unit harvests the electric power, and wherein the beacon data packets include information signaling an alert condition: and, a software application stored in and executed by at least a mobile computerized device, wherein the software application is configured to detect the beacon data packets broadcasted by at least one of the one or more control devices.

9. The computerized signaling system according to claim 8, wherein the software application is configured to generate and display a notification if the beacon data packets are detected by the mobile computerized device.

10. The computerized signaling system according to claim 9, wherein the software application is configured to send an alert message to one or more remote computerized devices or platforms if the beacon data packets are detected.

11. The computerized signaling system according to claim 9, wherein the software application is configured to transmit an acknowledgement message to the one or more control devices transmitting the beacon data packets if the beacon data packets are detected.

12. The computerized signaling system according to claim 8, wherein the software application is configured to send an alert message to one or more remote computerized devices or platforms if the beacon data packets are detected.

13. The computerized signaling system according to claim 12, wherein the software application is configured to transmit an acknowledgement message to the one or more control devices transmitting the beacon data packets if the beacon data packets are detected.

14. The computerized signaling system according to claim 8, wherein the software application is configured to transmit an acknowledgement message to the one or more control devices transmitting the beacon data packets if the beacon data packets are detected.

15. A switching device for an electrical installation, wherein the switching device comprises:

a control device that includes or is electrically connectable to a first power supply unit, wherein the first power supply unit is configured to harvest electric power from a feeding electric line to feed the control device, wherein the control device comprises:

a control unit;

a wireless transceiver unit operatively coupled to the control unit, wherein the wireless transceiver unit is configured to communicate with other electronic devices using a short-range communication protocol; and a second power supply unit operatively coupled to the wireless transceiver unit, wherein the second power supply unit is configured to feed the wireless transceiver unit when the first power supply unit cannot feed the control device, wherein the wireless transceiver unit is configured to broadcast beacon data packets cyclically and for a predetermined time interval if the first power supply unit cannot feed the control device due to an interruption of the electric feeding line from which the first power supply unit harvests the electric power, wherein the beacon data packets include information signaling an alert condition. and wherein the beacon data packets are detectable by at least a mobile computerized device, in which a software application configured to detect and process the beacon data packets is stored and executed.

16. The switching device according to claim 15, wherein the wireless transceiver unit is configured to communicate using a short-range communication protocol different from communication protocols using orthogonal frequency-division multiplexing (OFDM) or quadrature amplitude (QAM) techniques.

17. The switching device according to claim 15, wherein the wireless transceiver unit is configured to communicate using a Bluetooth or Zigbee communication protocol.

18. The switching device according to claim 15, wherein the wireless transceiver unit is configured to interrupt a transmission of the beacon data packets if the wireless transceiver unit receives an acknowledgment message from the mobile computerized device detecting the beacon data packets.

19. The switching device according to claim 15, wherein:

the control device comprises a first HMI unit operatively coupled to the control unit, and a user can set one or more transmission parameters of the beacon data packets by the wireless transceiver unit through the first HMI unit.

20. The switching device according to claim 19, wherein:

the control device comprises a second HMI unit operatively coupled to the wireless transceiver unit, a user can command the wireless transceiver unit to broadcast the beacon data packets through the second HMI unit, and the wireless transceiver unit is configured to broadcast the beacon data packets in response to a command received from the second HMI unit if the first power supply unit cannot feed the control device.

* * * * *